United States Patent [19]

Johnson

[11] Patent Number: 4,734,917
[45] Date of Patent: Mar. 29, 1988

[54] FLUORESCENT CONVERTER PUMPED CAVITY FOR LASER SYSTEM

[75] Inventor: Christopher D. Johnson, Binghamton, N.Y.

[73] Assignee: General Electric Company, Binghamton, N.Y.

[21] Appl. No.: 815,324

[22] Filed: Dec. 31, 1985

[51] Int. Cl.$^4$ ............................................. H01S 3/091
[52] U.S. Cl. ........................................ 372/70; 372/40
[58] Field of Search ................... 372/70, 39, 40, 41; 252/301.16, 301.18

[56] References Cited

U.S. PATENT DOCUMENTS

| | | | |
|---|---|---|---|
| 3,611,185 | 10/1971 | Gill | 372/70 X |
| 3,646,474 | 2/1972 | Segre | 372/70 X |
| 3,679,999 | 7/1972 | Chernock | 372/70 X |
| 4,044,315 | 8/1977 | Snitzer | 372/40 |
| 4,378,601 | 3/1983 | Eggleston, III et al. | 372/70 X |

Primary Examiner—Eugene R. LaRoche
Assistant Examiner—Seung Ham
Attorney, Agent, or Firm—I. David Blumenfeld

[57] ABSTRACT

A Multi-Flash Lamp laser system incorporates a solid state fluorescent converter. The multiple Flash Lamps are symmetrically positioned on opposite sides of the major dimension of the lasing material but avoid coupling of light between the lamps. The optical efficiency of the laser systems is enhanced by means of a fluorescent converter positioned between the lamps and the laser to reduce reflector losses and convert light outside of the laser pumping band to the pumping band wave lengths.

5 Claims, 2 Drawing Figures

4,734,917

FLUORESCENT CONVERTER PUMPED CAVITY FOR LASER SYSTEM

BACKGROUND OF THE INVENTION

This invention relates to a laser system in which the laser material is excited by a plurality of lamps positioned symmetrically with respect to laser material and includes a fluorescent converter to enhance optical efficiency by shifting light outside of the laser pumping to wavelengths useful in pumping the laser material.

PRIOR ART

This invention relates to a laser system having multiple flash lamps symmetrically positioned with respect to the laser material and fluorescent converter elements positioned with respect to the lamps and the laser material for enhancing the optical efficiency of the system.

Laser systems utilizing more than a single flash lamp for pumping the laser material have been utilized in the past but have suffered from the problem that the laser material is often heated unequally by the laser lamps resulting in distortions due to lateral heat flow in the laser material thereby producing optical distortions referred to as a "lensing" effect. In addition, in such previous systems much of the light from the flash lamp was lost due to the reflector losses and diffusion of the light emitted from the flashlamp. Furthermore, part of the light emitted by the flash lamps was directed to the other flash lamp rather than to the laser material thus serving no useful prupose.

SUMMARY OF THE INVENTION

Applicant has found that many of these problems may be reduced or eliminated and the system efficiency increased by as much as 30 or 40% by positioning the lamps symmetrically with respect to a major dimension of the laser so that light from each lamp is absorbed by the laser material and does not strike the other lamp. Thus, neither lamp can "see" the other due to the intervening material while simultaneously equalizing the heat load on the laser slab. Furthermore, an active material, in the form of a fluorescent converter, is interposed between the lamps, the reflecting surfaces and the laser slab thereby converting light outside of the useful spectral bands of the laser into useful spectral bands thereby enhancing the optical efficiency of the system. In addition, the interposition of these fluorescent converters reduced reflector losses and diffuses the light to the surface of the laser.

The surfaces of the fluorescent reflector are so constructed as to direct both emitted light from the flash lamp and light emitted by the fluorescent converter element to specific and controlled surfaces of the laser material where it may be absorbed and utilized.

It is therefore a principal objective of this invention to provide a high efficiency laser system utilizing light sources for pumping the laser positioned symmetrically with respect to the laser to equalize heat distribution in the laser;

Another objective of the invention is to provide a laser system in which the laser and other materials are interposed between the symmetrically positioned lamps in a manner such that the lamps do not affect each other;

Yet another objective of the invention is to provide a laser system in which symmetrically positioned multiple flash lamps sources are combined with fluorescent converters to enhance the optical efficiency of the system;

Other objectives and advantages of thenvention will become apparent as the description thereof proceeds.

The various objectives and advantages of the invention are realized in laser system in which a lasing material, preferably a neodymium-glass neodymium YAG laser slab has light sources positioned on opposite sides of a major dimension of the slab; i.e., the width. Positioned around the flash lamps and between the reflecting surfaces for the lasing cavities are fluorescent converter elements which cause a spectral shift of light in the nonpumping wavelengths into in the laser pumping band wavelengths.

The surfaces of the fluorescent converters which are positioned adjacent to the lamps and the opposite ends of the laser are so configued so that directly emitted flash lamp light and the spectrally shifted light emitted by the fluorescent element are directed to specific surfaces of the laser material, further enhancing the optical efficiency of the system.

Other features believed characteristic of this invention are set forth with particularity in the appending claims. The invention itself, however, together with other objectives and advantages thereof, will be best understood by reference to the following description taken in conjunction with the accompanying drawings in which:

Figure 1:
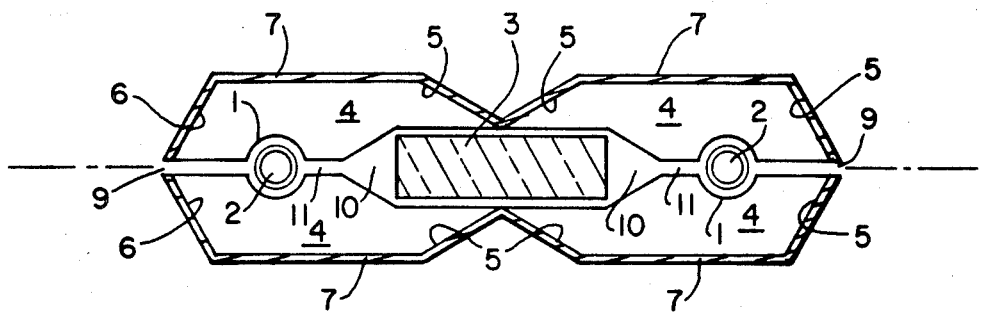
FIG. 1 is a schematic illustration of a laser having two flash lamps positioned symmetrically with respect to the laser.

FIG. 1 illustrates a fluorescent converter pump cavity using two flash lamps for a laser slab. The two-lamp solid state fluorescent converter pump cavity includes a laser slab 3, which may be a neodymium glass or a neodymium YAG laser. The laser slab is shown in an end, or Brewster window, view with longitudinal axis of the laser slab extending into the plane of the paper. A pair of flash lamps 2 are positioned in flash lamp wells 1 on either side of laser slab 10. Fluorescent converter elements 4 are positioned above and below each one of the flash lamps and also project over a portion of the laser slab. Each of the fluorescent converter elements have angled reflecting surfaces shown at 5 and 6 respectively, which angled reflecting surfaces, in conjunction with the reflective layers 7 on the surface thereof, reflect any directly emitted flash lamp light as well as any light re-emitted by the fluorescent material onto the upper and lower surfaces of the laser slab. The angled reflecting surfaces (i.e., shown as beveled surfaces) reflect the light rays and the angle may be controlled to position the light rays on any selected surface of the laser slab.

Cooling fluid passages 9 permit coolant material to flow across the flash lamps and into a chamber 10 in which the laser slab is located. Passages 11 between the flash lamps and the end of laser slab 10 function both as coolant passages and as a direct illumination path for a portion of the light from the flash lamps to the edges of the laser slab. The width of these channels may be varied to control the amount of direct illumination of the laser slab.

By positioning the laser lamps on opposite sides of the laser slab and interposing the width of the slab as well as the fluorescent converter between the lamps, neither lamp can "see" the other due to the interviening material. That is, light from one lamp is not projected into the other lamp. At the same time, advantage is taken of the spectral shift of light from the flash lamp by the fluorescent converter elements into the region absorbed by the neodymium ions in the laser slab so that significant increases in laser pumping efficiencies are realized.

The laser material as pointed out above, may take the form of neodymium doped glass, neodymium glass doped YAGs as well as other laser materials presently available. The fluorescent converter consists of crystals of a variety of known material such as chromium doped emerald; trivalent chromium doped Gadolinium, Scandium, Gallium, garnet (GSGG) $Cr^{+3}$:GSGG; $Cr^{+3}$:SrGaF$_5$; $Cr^{+3}$:SrSAlF$_5$. These fluorescent materials product a spectral shift of light from the flash lamps which are outside of the pumping bands of the laser and re-emits them in the regions (380, 500, 880 nanometers) absorbed by the neodymium ions.

One of the fundamental advantages of an arrangement in which multiple flash lamps are positioned symmetrically with respect to the laser slab lies in the fact that it produces symmetric heating from either end of the laser slab. Due to this equalization of the heat load in the slab, optical distortions caused by uneven heating and lateral heat flow are eliminated or minimized.

Thus, the system of the invention as exemplified in FIG. 1 is characterized by (1) symmetrical placements of the flash lamps which produces symmetric heating and eliminates distortions; (2) the interposition of absorptive material between the flash lamps so that they do not "see" each other, hence resulting in single sided pumping; (3) interposition of an active material, i.e., a fluorescent converter material between the lamps and reflecting surface in laser slab reducing reflector losses, diffusing the light and converting light which falls outside the laser pumping bands into light within those bands.

In the description in FIG. 1, the fluorescent converters have been described as crystalline materials of various types which may be grown and then machined and shaped to the size shown to produce the fluorescent conversion phenomenon which increased the efficiency of the system. The fluorescent converters however need not be solid crystalline materials but may in the manner described in the applicant's copending invention filed concurrently with the instant invention on Dec. 31, 1985, identified as Ser. No. 815,326 and entitled Glass Matrix Fluorescent Converter, and assigned to the General Electric Company, the assignee of the present invention. In said copending application, a fluorescent converter structure is shown in which small fluorescent converter particles are supported in and distributed throughout a glass matrix which is highly transmissive to the light from the flash lamps as well as to the light in the laser pumping bands re-emitted by the fluorescent particles. Such a glass matrix supported fluorescent converter has many advantages in that it can be readily fabricated in a variety of shapes and requires only very small fluorescent converter particles rather than single large size crystals.

Figure 2:
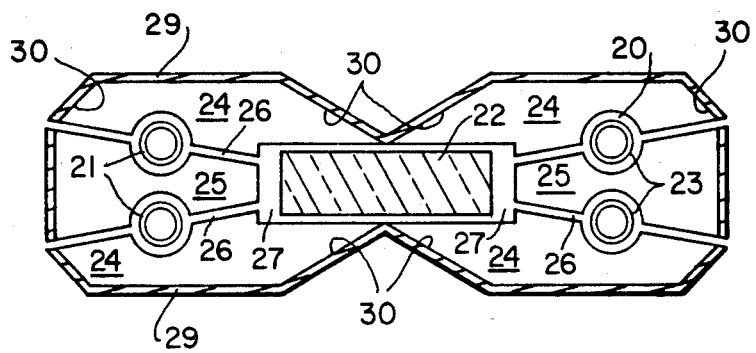
FIG. 2 is a four-lamp system in which two lamp pairs are positioned symmetrically on opposite ends of the laser and symmetrically to each other.

FIG. 2 illustrates a four flash lamp solid state fluorescent converter pump cavity in which flash lamps pairs are symmetrically positioned on opposite sides of the laser slab with the laser slab interposed between the lamp pairs in a manner similar to that shown in FIG. 1. Thus in FIG. 2 pump cavity includes flash lamp pairs 20 and 21 symmetrically positioned on opposite sides of a laser slab 22. The flash lamp pairs 20 and 21 are positioned in their individual circular flash lamp wells 23. A plurality of fluorescent converters 24 and interlamp fluorescent converters 25 are positioned respectively between the lamps and the laser slab 22 and between the lamp pairs on opposite sides of the laser slab. Coolant channels 26 communicate between the flash lamp wells and the chamber 27 in which the laser slab 22 is disposed. These cooling passages or channels allow passage of coolant across the lamps and into the laser chamber to permit cooling both of the lamps and the laser. The portion of the coolant channels between the flash lamps and the laser chamber act also as a direct illumination path for light emitted from the lamps for directly pumping the opposite sides of the laser slab.

Metallic reflecting layers 29 preferably of silver, are positioned over the surfaces of the fluorescent converter elements to reflect light emitted by the flash lamps back into the fluorescent converter elements and then back to the laser slab. The fluorescent converter elements 25 contain angled reflecting surfaces 30 which are shown in the form of beveled surfaces. The angles of these beveled surfaces may be varied.

The end chamber 27, which communicates with the coolant channesl 26 from the individual flash lamps form small rectangles. One of the advantages of this configuration is that the coolant fluid enters the chamber in which the laser slab is positioned and flows over the top and bottom of the laser but a stagnant layer of cooltant fluid is usually formed along the edges of the laser in chamber 27. The stagnant layer of coolant fluid along the surface forms a heat barrier along forcing heat flow within the laser slab in an upward or downwardly direction toward the major surfaces of the laser slab; i.e., it prevents lateral heat flow across the laser. This is very significant in that it reduces optical distortions along that axis, caused by lateral heat flow. These distortions along the lateral dimension of the laser slab can result in so-called lensing effects as the lateral dimension of the laser slab is affected by such lateral heat flow. Thus, by providng a stagnant coolant fluid layer along these edges to product a heat barrier very desirable results flow in that these optical distortions are eliminated or minimized.

It will be apparent from the foregoing that a highly efficient solid state laser cavity system has been described in which the optical pumping efficiencies of the system are increased substantially by means of the symmetrical positioning of multiple flash lamp sources combined with the use of fluorescent convertng materials for optimizing the utilization of the light emitted from the flash lamps by the laser material.

How particular embodiments of this invention have been shown and described above, it will, of course, be understood that the invention is not limited thereto since many modifications thereof may be made. It is, therefore, contemplated by the appended claims to cover any such modifications which fall within the true spirit and scope of this invention.

What is claimed as new and desired to be secured by Letters of the United States is:

1. A multi-lamp laser system comprisng:
   (a) an active slab laser element having major planar surfaces;
   (b) a plurality of lamps positioned symmetrically with respect to said laser element and on opposite ends of said major surfaces;

(c) solid fluorescent converter elements having interior and outer surfaces, said interior surfaces of said converter elements defining an interior cavity for surrounding and retaining said slab laser, and additional interior cavities for supporting said plurality of lamps;

(d) passage means communicating between each of said lamp cavities and the interior cavity retaining said laser to provide a direct illumination path to said laser from each of the lamps, (e) metallic reflecting means on the outer surfaces of said converter elements to reflect light from said lamp transmitted through said converter elements as well as spectrally shifted light from the fluorescent conversion taking place in said converter elements onto the major surfaces of said slab laser element;

(f) said passage means communicating between each of said lamp cavities and the minor surface of said slab laser element whereby the minor surfaces of said laser is directly pumped by a portion of the light emitted from said lamps.

2. The multi lamp laser system according to claim 1 including means for passing collant through said passages to cool said lamps and said laser element.

3. The multi lamp laser system according to claim 1 wherein said plurality of lamps includes individual lamp pairs positioned symmetrically with respect to said laser element and each other.

4. The multi lamp laser system according to claim 3 wherein fluorescent converter elements are also positioned between the lamps in each lamp pair.

5. The multi lamp laser system according to claim 2 wherein said coolant flows into said chamber to form a stagnand fluid layer along the laser edges thereby minmizing lateral heat flow in said laser slab.

* * * * *